United States Patent [19]
Uchida et al.

[11] Patent Number: 6,048,263
[45] Date of Patent: Apr. 11, 2000

[54] HEATING, VENTILATION, AND AIR CONDITIONING UNIT FOR AUTOMOTIVE VEHICLES

[75] Inventors: Toshiya Uchida, Novi, Mich.; Toshiyuki Yoshida, Saitama, Japan; Katsuaki Koshida; Katsuhiro Kurokawa, both of Tochigi, Japan

[73] Assignee: Calsonic Corporation, Tokyo, Japan

[21] Appl. No.: 09/106,206

[22] Filed: Jun. 29, 1998

[30] Foreign Application Priority Data

Sep. 29, 1997 [JP] Japan ................................. 9-264050
Sep. 29, 1997 [JP] Japan ................................. 9-264055

[51] Int. Cl.$^7$ ............................................. B60H 1/32
[52] U.S. Cl. ...................... 454/121; 165/204; 454/144; 454/156
[58] Field of Search ............................. 165/42, 43, 204; 454/121, 126, 144, 156

[56] References Cited

U.S. PATENT DOCUMENTS

| | | | |
|---|---|---|---|
| 4,762,169 | 8/1988 | Andersen et al. | 454/121 X |
| 5,699,851 | 12/1997 | Saida et al. | 454/121 X |
| 5,884,689 | 3/1999 | Takechi et al. | 454/121 X |

*Primary Examiner*—Harold Joyce
*Attorney, Agent, or Firm*—Foley & Lardner

[57] ABSTRACT

An automobile heating, ventilation, and air conditioning (HVAC) unit comprises a heating, ventilation, and air conditioning case permitting the flow of interior air, an evaporator core disposed in the case for taking heat from the interior air to produce cool air, a heater core disposed in the case downstream of the evaporator core for adding heat to the cool air to produce warm air, an air mix chamber defined in the case for blending the cool air with the warm air, an air mix door disposed between the evaporator core and the heater core for controlling the percentage of the cool air and the warm air being fed into the air mix chamber, depending on the position of the air mix door, and a foot-vent communication passage defined in the case by partitioning the rear end of the air mix chamber by a partition wall extending substantially vertically along the inner wall of the case, so that the foot-vent communication passage communicates with the downstream end of the air mix chamber. The case has foot vent outlets at the lower end of the foot-vent communication passage.

7 Claims, 7 Drawing Sheets

HEATING, VENTILATION, AND AIR CONDITIONING UNIT FOR AUTOMOTIVE VEHICLES

BACKGROUND OF THE INVENTION

1. Field of the Invention

The present invention relates to an automobile heating, ventilation, and air conditioning unit usually abbreviated to "HVAC unit" or to "HVAC module", and specifically to a one-box type automobile HVAC unit capable of being automatically controlled through either an electronic control unit (ECU) or an electronic control module (ECM), or a body control module or a body computer module (BCM).

2. Description of the Prior Art

In recent years, there have been proposed and developed various automobile heating, ventilation, and air conditioning (HVAC) systems whose automatic control can be achieved by an ECU/ECM coordinating all engine functions such as the fuel injection and ignition system or a BCM handling the functions of controlling such items as an electronic comfort control system or an electronic climate control system. A typical HVAC unit contained in the electronic climate control system (ECC system), has at least a heating, ventilation, and air conditioning (HVAC) case, an evaporator core assembly, and a heater core assembly. The HVAC case defines therein an air mix chamber in which the evaporator core air (cold air) and the heater core air (warm air) are properly blended or mixed, depending on the degree of air-mix-door opening. The air mix door is generally constructed as a pivotable or swingable air mix door flap. The amounts of blended air or conditioned air flowing through the vent outlet, the defroster outlet, and the foot vent outlet are adjusted by regulating the position of the respective control doors. The HVAC case has the vent, defroster, and foot-vent outlets above the air mix chamber. In order to attain the discharged-air amount regulation or the discharge mode control on the rear passenger compartment, the conventional HVAC unit requires a rear vent outlet on the upper wall of the HVAC case in addition to the vent outlet containing a center vent, and side vents, and also requires an additional control door for opening and closing the rear vent outlet. Additionally, a rear vent duct must be connected to the rear vent outlet to feed the conditioned air (temperature-blended air) to the rear passenger compartment. Usually, the rear vent duct and the foot vent duct are fitted to the outside wall of the HVAC case so that the rear vent duct extends downwards from the rear vent outlet along the HVAC case outside wall and so that the foot vent duct extends downwards from the foot vent outlet along the outside wall of the HVAC case to direct conditioned air toward the floor outlet. The HVAC unit is thus large-sized and its structure is complicated. This increases the number of parts of the HVAC unit. When installing a prior art HVAC unit as set out above within the vehicle passenger compartment, it is necessary to mount the HVAC unit having the foot-vent and rear vent ducts significantly projected from the HVAC-case outer wall on the vehicle with caution without interfering with any functional component parts incorporated on or in the vehicle instrument panel, such as the instrument-panel cluster assembly, the wiring harness assembly, the voice/chime module, or the like. Projected duct portions may disturb easy installation of the HVAC unit within the passenger compartment. Also, in the conventional HVAC unit, air properly conditioned or temperature-adjusted within the air mix chamber is generally discharged or blown into the rear passenger compartment through the rear vent outlets, as well as into the front passenger compartment through the front vent outlets (containing center, side vents). Therefore, the conventional HVAC unit having the ventilation-duct and discharge-outlet structure, cannot make independent temperature adjustments on the front and rear passenger compartments. It is desired to make independent temperature adjustments on the front and rear sides of the vehicle with a simple HVAC unit being compact in size.

SUMMARY OF THE INVENTION

Accordingly, it is an object of the invention to provide a heating, ventilation, and air conditioning unit for automotive vehicles that avoids the aforementioned disadvantages of the prior art.

It is another object of the invention to provide an automobile heating, ventilation, and air conditioning (HVAC) unit, being compact in size and light in weight, and having an improved simple ventilation-duct and discharge-outlet and partition-wall structure that ensures a conditioned-air flow passing through a rear vent outlet, reducing total production costs (with reduced number of component parts of the HVAC unit) and also enhancing installation flexibility.

It is a further object of the invention to provide an automobile heating, ventilation, and air conditioning (HVAC) unit, being compact in size and light in weight, and having an improved simple ventilation-duct and discharge-outlet and partition-wall structure that can make independent temperature regulations on the front and rear sides of the vehicle according to front and rear vehicle occupant's wishes with reduced number of component parts of the HVAC unit and enhanced installation flexibility.

In order to accomplish the aforementioned and other objects of the present invention, an automobile heating, ventilation, and air conditioning (HVAC) unit comprises a heating, ventilation, and air conditioning case permitting the flow of interior air, an evaporator core disposed in the case for taking heat from the interior air to produce cool air, a heater core disposed in the case downstream of the evaporator core for adding heat to the cool air to produce warm air, an air mix chamber defined in the case for blending the cool air with the warm air, an air mix door disposed between the evaporator core and the heater core for controlling the percentage of the cool air and the warm air being fed into the air mix chamber, depending on a position of the air mix door, and a foot-vent communication passage defined in the case by partitioning the rear end of the air mix chamber by a partition wall extending substantially vertically along the inner wall of the case so that the foot-vent communication passage communicates with the downstream end of the air mix chamber. The case has foot vent outlets at the lower end of the foot-vent communication passage. It is preferable that the case has a rear vent outlet in close vicinity to the foot vent outlet. The HVAC unit may further comprise a mode door for adjusting the percentage of conditioned air through the foot vent outlet and conditioned air through the rear vent outlet. More preferably, the foot-vent passage is divided into a plurality of partitioned air passageway sections by means of partition walls, and the rear vent outlet is formed in a part of the case corresponding to either one of the partitioned air passageway sections, and a pivot shaft of the mode door is provided to cross the partitioned air passageway sections in a transverse direction. The HVAC unit may further comprise a plurality of door flaps being fixedly connected to respective individual shaft sections of the pivot shaft, each corresponding to either one of the partitioned air passageway sections. It is preferable that the case has a vent outlet in an upper wall of the case above the air mix chamber, and a vent door is provided along the inner peripheral wall surface of the upper wall of the case for opening and closing the vent outlet. Furthermore, it is preferable that the vent door assembly comprises a sliding mechanism and a sliding door being slidable along the inner peripheral wall surface of the upper wall of the case by the sliding mechanism and operated between a shut-off position in which the vent outlet is shut off and a retracted position in which the vent door is fully opened to permit conditioned-air flow through the vent outlet without disturbing conditioned-air flow from the air mix chamber within towards the foot-vent communication passage.

The HVAC unit may further comprise a rear vent passage being defined within the case so that the rear vent passage communicates with an air-delivery passage between the evaporator core and the heater core and extends back and forth at the bottom of the case. In addition, the case has a rear vent outlet at the rear end of the rear vent passage. The lower end of the heater core is located to enter partly into the rear vent passage so as to form a heat exchanger (approximately one-fourth the entire length of the heater core) for rear passenger compartment temperature adjustment independently of a heat exchanger (approximately three-fourth the entire length of the heater core) for front passenger compartment temperature adjustment. Also provided is a bypass passage defined below the heat exchanger for the rear passenger compartment temperature adjustment. The HVAC unit may further comprise a mode-select door located in close vicinity to the heat exchanger (the bottom edge of the heater core) for controlling the percentage of the cool air flowing through the bypass passage into the rear vent passage and the warm air flowing through the heat exchanger into the rear vent passage. Preferably, the mode-select door comprises a pivot shaft mounted in close vicinity to a front bottom edge of the heat exchanger, a first door flap located upstream of the heat exchanger and supported rotatably on the pivot shaft, a second door flap disposed within the bypass passage and supported rotatably on the pivot shaft, and a mode-control mechanism mechanically linked to the first and second door flaps for providing four operating modes, namely a shut-off mode in which the cool air coming from the evaporator is prevented from being delivered into the rear vent passage, a full cool mode in which the cool air coming from the evaporator core toward the rear vent outlet is permitted to be routed through only the bypass passage, an air mix mode in which the cool air coming from the evaporator core toward the rear vent outlet is permitted to be routed through both the bypass passage and the heat exchanger, and a full hot mode in which the cool air coming from the evaporator core toward the rear vent outlet is permitted to be routed through only the heat exchanger. The mode-control mechanism may comprise first and second guide pins attached to the respective door flaps, and a cam plate having a cam groove through which the cam plate is in cam-connection with the guide pins to produce respective individual pivotal motions of the door flaps, depending on forward and backward movements of the cam plate. Preferably, a rear foot vent outlet is provided in close vicinity to the rear vent outlet at the rear end of the rear vent passage. Moreover, it is preferable that a mode door is disposed within the rear vent passage for adjusting the amount of conditioned air to be delivered to the rear vent outlet and the amount of conditioned air to be delivered to the rear foot vent outlet.

DESCRIPTION OF THE PREFERRED EMBODIMENTS

Figure 1:
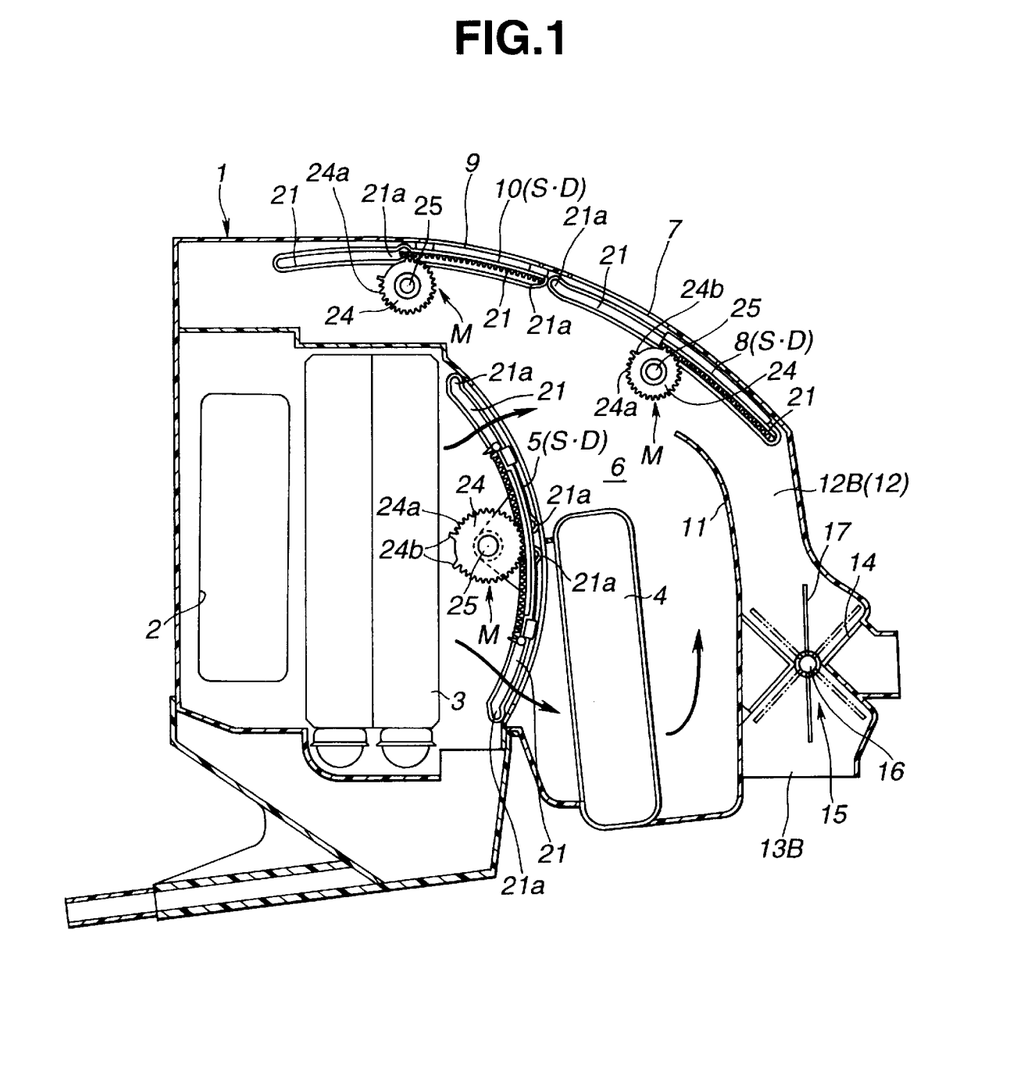
FIG. 1 is a longitudinal cross-sectional view illustrating one embodiment of an automobile heating, ventilation, and air conditioning (HVAC) unit of the invention.
Figure 2:
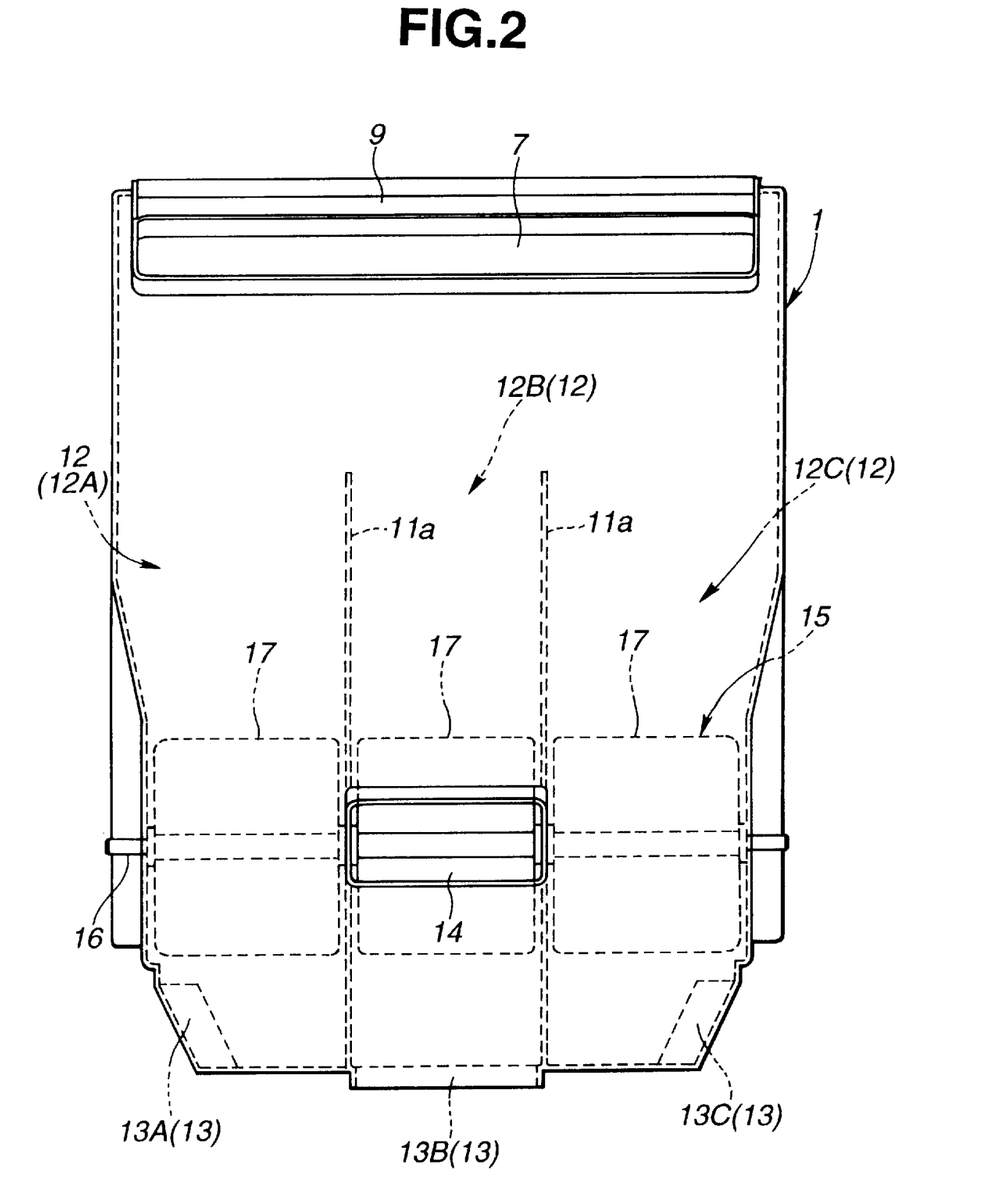
FIG. 2 is a back view illustrating the HVAC unit of the embodiment shown in FIG. 1.
Figure 3:
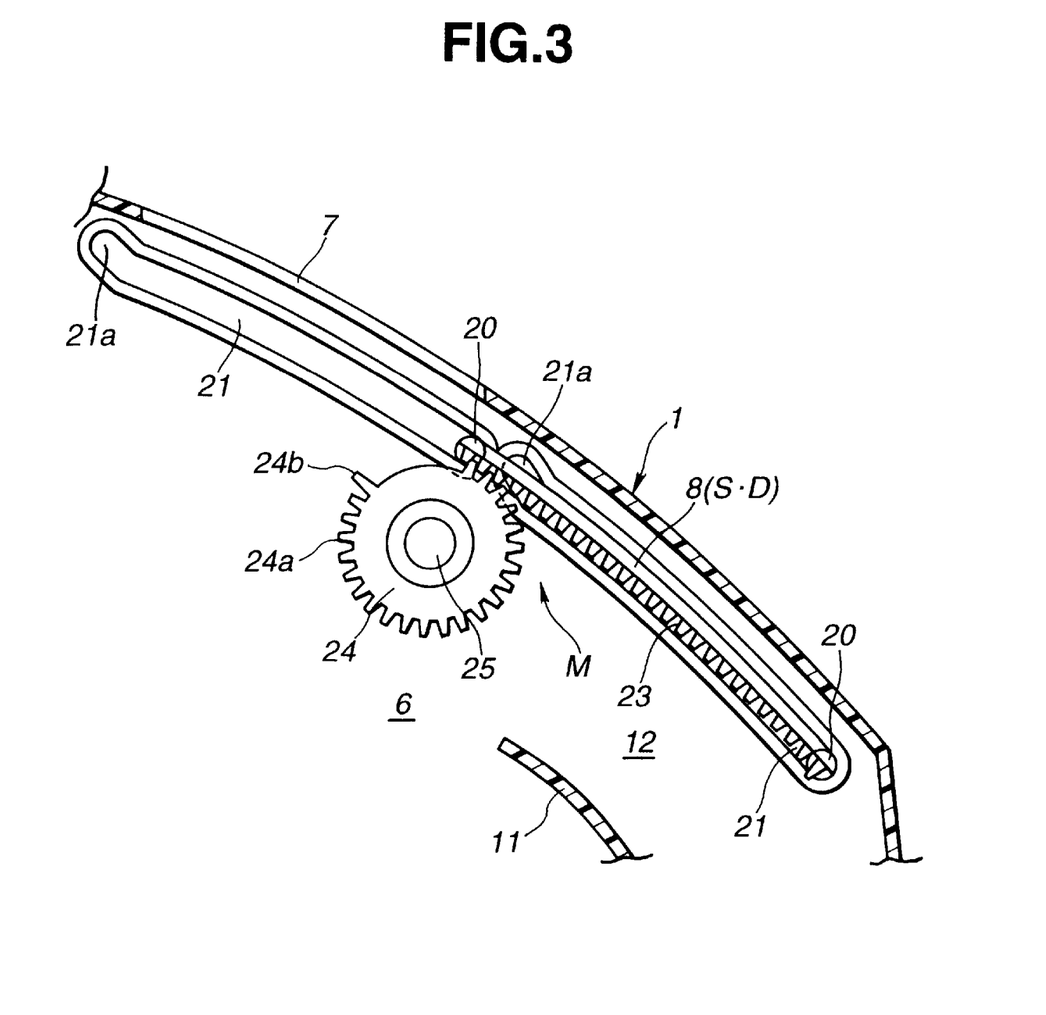
FIG. 3 is an enlarged partial cross section illustrating a vent discharge-outlet portion of the HVAC unit of the embodiment.

Referring now to the drawings, particularly to FIGS. 1 through 3, reference sign 1 denotes a casing of a heating, ventilation, and air conditioning (HVAC) unit, simply called a "HVAC case". The HVAC case 1 accommodates therein an evaporator core 3 and a heater core 4 from the upstream side of the flow of air discharged by a blower fan of a blower unit (not shown), in that order. The duct connection (joint) portion of the blower fan is connected to a discharged-air inlet 2 formed at the front of the HVAC case and on the side wall thereof. An air mix door (or a temperature blend door) 5 is provided between the evaporator core 3 and the heater core 4. The air mix door 5 is operated at three operating modes, namely a maximum cooling mode in which the interior air is routed through the evaporator core 3, while the air mix door 5 moves down toward its first shut-off position or the lowermost position (viewing FIG. 1) to seal off the heater core 4, a maximum heating mode in which the air mix door 5 moves up toward its second shut-off position or the uppermost position (viewing FIG. 1) to admit most of air passing through the evaporator core 3 to be routed through the heater core 4, and a temperature blend mode in which the air mix door 5 is held at a computer-controlled, intermediate position between the uppermost and lowermost positions to properly control or adjust the percentage of evaporator-core air (cool air) and heater-core air (warm air) being fed into the passenger compartment. An air mix chamber 6 is defined in the HVAC case 1 above the top of the heater core 4, in order to blend both the cold and warm air flows. A vent outlet 7 is formed in the upper wall of the HVAC case 1 above the air mix chamber 6. The vent outlet 7 is opened and closed by means of a vent door 8. Also, a defroster 9 is formed in the upper wall of the HVAC case 1 in front of and adjacently to the vent outlet 7. The degree of opening of the defroster 9 is changeable by varying the position of a defrost door 10. The HVAC case 1 is formed with a partition wall 11 at the downstream side of the air mix chamber 6 to define a foot-vent/rear-vent communication passage 12. The foot-vent/rear-vent communication passage 12 is defined by way of the partition wall 11 in such a manner as to extend substantially vertically along the inner wall surface of the HVAC case 1. The lower end (or the downstream end) of the communication passage 12 is formed as a foot vent outlet 13, while the upper end (or the upstream end) of the communication passage 12 communicates with the air mix chamber 6 in the vicinity of the vent outlet 7. As clearly seen in FIG. 2, the foot-vent/rear-vent communication passage 12 is divided into three air passageway sections 12A, 12B and 12C in the transverse direction by way of two partition walls (11a, 11a). The HVAC case 1 is formed at its rear end with a rear vent outlet 14 communicating with the downstream side of the central partitioned air passageway 12B. The foot vent outlet 13A formed at the downstream end of the left-hand partitioned air passageway 12A is used to deliver conditioned air toward the driver's seat side, whereas the foot vent outlet 13C formed at the downstream end of the right-hand partitioned air passageway 12C is used to deliver conditioned air toward the assistant's seat side. On the other hand, the foot vent outlet 13B is formed at the rearmost end of the central partitioned air passageway 12B. The foot vent outlet 13B of the central partitioned air passageway 12B is used as a rear foot vent outlet to deliver conditioned air toward the rear passenger compartment. As seen in FIGS. 1 and 2, the rear vent outlet 14 is formed in close vicinity to the rear foot vent outlet 13B. A mode door 15 is disposed in the foot-vent/rear-vent communication passage 12 for adjusting the percentage of conditioned air flowing through the foot vent outlet 13 and conditioned air flowing through the rear vent outlet 14. The mode door serves as a conditioned-air delivery mode select door, as fully described later. The mode door 15 comprises a pivot shaft 16 extending in the transverse direction and crossing the communication passage 12 in such a manner as to penetrate perpendicularly through both side walls of the HVAC case 1 and to penetrate perpendicularly through the two partition walls (11a, 11a). Although it is not clearly shown, the pivot shaft 16 is rotatably supported by way of radial bearings fitted to the penetrated portions of the two partition walls (11a, 11a) and the penetrated portions of both side walls of the HVAC case 1. The mode door 15 comprises three door flaps (17, 17, 17) being fixedly connected to the respective individual pivot-shaft sections, each corresponding to either one of the left-hand partitioned air passageway 12A, the central partitioned air passageway 12B, and the right-hand partitioned air passageway 12C. At the downstream end of the foot-vent/rear-vent communication passage 12, the wall surface of the rear end of the HVAC case 1 is enlarged outwardly backwards, so that two portions of the substantially vertically extending rear wall section of the HVAC case 1 facing the communication passage 12 are enlarged or ridged backwards to permit the pivotal motion of each mode door flap 17 (the sectorial angular motion of each half of the respective mode door flap 17, as seen from the side view of FIG. 1). As shown in FIG. 1, the rear vent outlet 14 is formed or opened in the lower sloped surface of the upper ridged portion of the rear end wall of the HVAC case 1. The mode door 15 is operable in at least three air-delivery modes, namely a vent mode in which the mode door 15 is held at its maximum anti-clockwise rotational position (the maximum forwardly inclined position) to fully open the rear vent outlet 14 and simultaneously-to close the foot vent outlets 13A to 13C, a defrost mode in which the mode door 15 is held at its maximum clockwise rotational position (the maximum backwardly inclined position) to close all of the rear vent outlet 14 and the foot vent outlets 13A to 13C, and a foot mode in which the mode door 15 moves to a midpoint between the maximum forwardly inclined position and the maximum backwardly inclined position, which midpoint essentially corresponds to a vertical position of the mode door flap 17 as indicated by the solid line of FIG. 1, to close the rear vent outlet 14 and to open each of the foot vent outlets 13A to 13C. Each of the upside two doors 8 and 10 is constructed by a sliding door unit. The sliding door unit comprises a sliding door (S.D) and a sliding mechanism M. The vent door 8 is slidable between a shut-off position in which the vent outlet 7 is fully closed and a sliding-door retracted position in which the vent outlet 7 is fully opened. In the same manner, the defrost door 10 is slidable between a shut-off position in which the defroster 9 is fully closed and a sliding-door retracted position in which the defroster 9 is fully opened. The sliding motion of each of these doors 8 and 10 is produced by the sliding mechanism M. The sliding vent-door assembly 8 and the sliding defrost-door assembly 10 are located adjacent to each other, and also both of the sliding door assemblies 8 and 10 are installed along the upper curved wall surface of the HVAC case 1 such that the sliding doors (S.D), respectively constructing the vent door 8 and the defrost door 10, are slidable along the curved inner peripheral surface of the upper curved wall of the HVAC case 1. As can be appreciated from FIG. 1, the retracted position of the vent door 8 is determined, so that the vent door 8 held at the retracted position never disturbs the flow of blended air (or the flow of conditioned air) coming from the air-mix chamber 6 within towards the upstream end of the foot-vent/rear-vent communication passage 12. In more detail, the vent door 8, constructed as a sliding door (S.D), can be shifted to the retracted position with its sliding motion along the inner peripheral wall of the HVAC case 1 from the shut-off position of the vent outlet 7 toward the upstream end of the foot-vent/rear-vent communication passage 12. Also, the sliding vent-door assembly 8 is installed on the HVAC case 1, such that the rear end of the vent door 8 partly enters into the connection portion between the air mix chamber 6 and the upstream end of the foot-vent/rear-vent communication passage 12 under a particular condition where the vent door 8 has been fully opened. In other words, the above-mentioned retracted position of the vent door 8 is properly determined by setting the upper end of the partition wall 11 near the rear end of the vent door 8 fully opened, since the upper end of the partition wall 11 defines the previously-noted connection portion between the air mix chamber 6 and the upstream end of the communication passage 12. On the other hand, the retracted position of the defrost door 10 is set within the dead space above the installation position of the evaporator core 3, so that the defrost door 10 never disturbs the flow of conditioned air toward the defroster 9 when the defrost door 10 slides forward from its shut-off position and then the defroster 9 fully opens. Details of the sliding-door assembly constructing each of the vent door 8 and the defrost door 10, are described hereunder.

Figure 4:
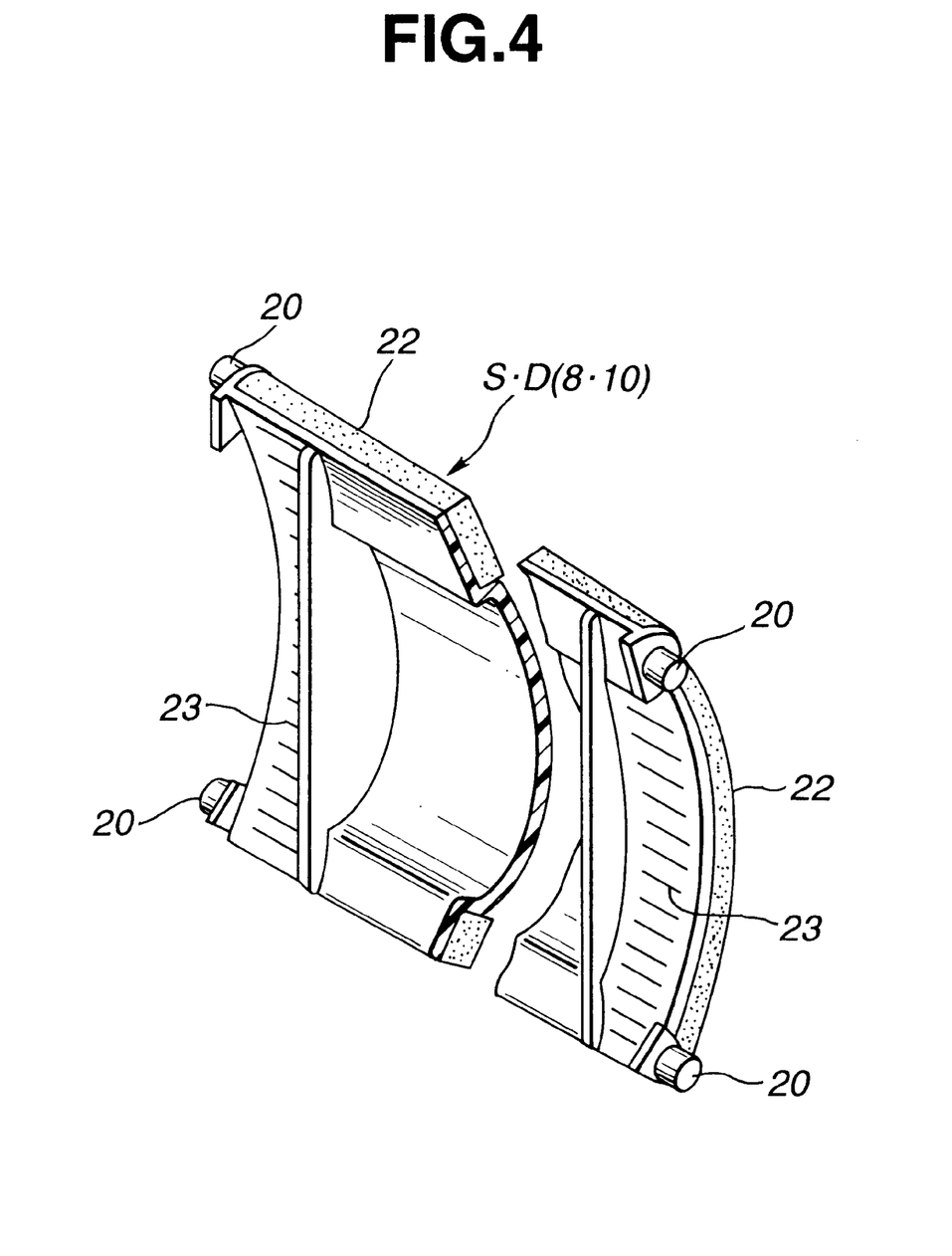
FIG. 4 is a disassembled view illustrating a sliding-door component part being used as a vent door and a defroster door.
Figure 5:
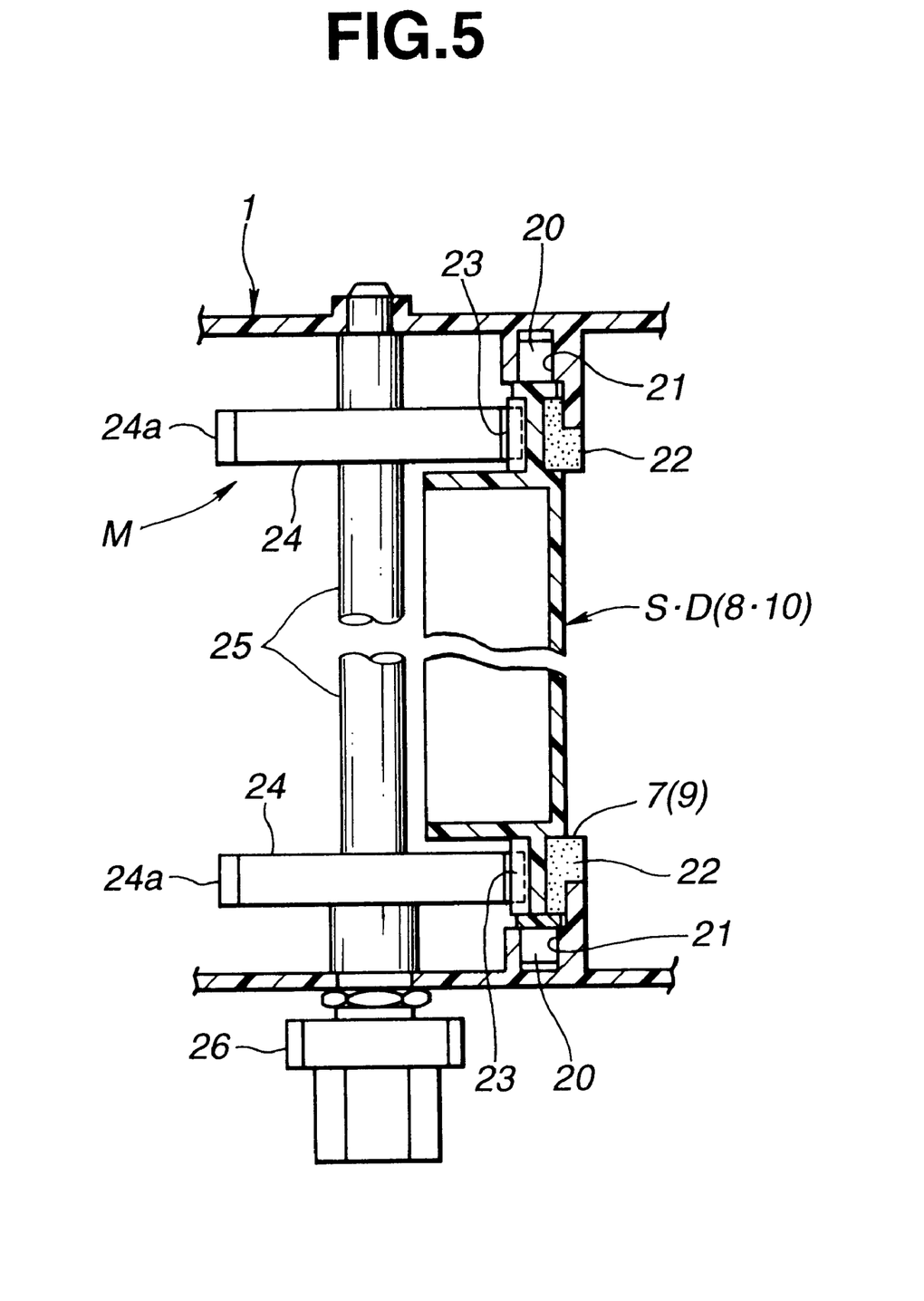
FIG. 5 is a lateral cross sectional view showing details of a sliding mechanism for the sliding door shown in FIG. 4.

As seen in FIGS. 3 to 5, particularly FIGS. 3 and 4, the sliding door (S.D) has a circular arc shape formed to conform to the upper curved wall surface of the HVAC case 1. As best seen in FIG. 4, the slide door has four guide pins 20 projected from the circular-arc shaped side walls at four corners of both front and rear ends of the sliding door (S.D). In the shown embodiment, although the four guide pins 20 are provided to guide the sliding motion of the sliding door, it will be appreciated that four guide rollers may be provided for the same purpose. As clearly seen in FIGS. 3 and 5, the HVAC case 1 is formed at both side walls with two pairs of cam grooves (or guide grooves) 21. The right-hand cam-groove pair (21, 21) is comprised of a front-right cam groove and a rear-right cam groove, whereas the left-hand cam groove pair (21, 21) is comprised of a front-left cam groove and a rear-left cam groove. The above-mentioned four guide pins engage slideably with the respective cam grooves to ensure the sliding motion of the sliding door (S.D) between the shut-off position and the retracted position. As seen in FIG. 3, the respective cam groove 21 is essentially correspondingly shaped with respect to the circular-arc shape of the upper curved wall surface of the HVAC case 1, so as to admit the smooth sliding motion of the sliding door (S.D). However, the frontmost end portion 21a of each cam groove 21 is formed to be slightly upwardly bent toward the upper wall of the HVAC case 1. The cam-groove frontmost end portion 21a functions to restrict the shut-off position of the sliding door (S.D). During the shut-off motion of the sliding door, the guide pin 20 moves or slides from the rearmost end of the associated cam groove 21 substantially along the curved inner peripheral wall surface of the HVAC case 1 due to the correspondingly shaped cam groove. As soon as the guide pin 20 enters into the frontmost end portion 21a, the guide pin 20 begins to move toward the inner peripheral wall surface of the HVAC case 1 by way of the slightly upwardly inclined shape of the frontmost end portion 21a. During the ending time period of the shutting-off motion of the sliding door, such slight upward shifting motion of the sliding door (S.D) permits a seal member 22 fitted to the perimeter of the upper face of the sliding door to be brought into lip-contact with the inner peripheral edge of the vent outlet 7 or the defroster 9. This ensures a tight seal and a stable positioning of the sliding door in the shut-off position. As best seen in FIG. 4, the sliding door (S.D) is formed, on its inner curved wall face and at both sides, with a pair of rack members each having an inner toothed portion 23. On the other hand, a pair of pinion gears 24 are fixedly connected to a drive shaft 25, so that the two pinion gears 24 are in meshed-engagement with the respective toothed portions 23 formed on the inner wall of the case 1. The drive shaft 25 is rotatably supported by the two side walls of the HVAC case 1. Thus, the two pinion gears 24 are rotatable together with the drive shaft 25. As best seen in FIG. 5, one drive-shaft end is connected to the output shaft of a reduction-gear box 26. Generally, the input shaft of the reduction gear box 26 has a driven connection with a reversible electric motor (not shown). In FIG. 5, although only the reduction-gear box 26 is illustrated, the electric motor and the reduction-gear box may be constructed commonly as a geared motor. With the aforementioned arrangement, the respective pinion gears 24 can be rotated in two opposite rotational directions by normal-rotation and reverse-rotation of the drive shaft 25. Almost all teeth of the toothed portion 24a of the pinion 24 are formed as teeth, each having a comparatively lower tooth depth, while the last tooth (the endmost tooth) of the toothed portion of the pinion gear 24 is formed as a tooth 24b having a comparatively higher tooth depth. At the end of the shut-off period, the higher tooth 24b serves to push the sliding door up to ensure the previously-noted lip contact and stable positioning. In the same manner as the previously-discussed vent door 8 or defroster door 10, in the shown embodiment, the air mix door 5 is also constructed by a substantially circular-arc shaped sliding door (S.D) which is slidable up and down by means of the sliding mechanism M. As seen in FIG. 1, the sliding mechanism M for the air mix door 5, is located between the evaporator core 3 and the heater core 4 and formed as a backwardly curved sliding mechanism extending upward and downward. In the sliding mechanism M for the air mix door 5, note that the uppermost and lowermost ends 21a of each of the upper and lower cam grooves 21 are both slightly inclined backwards. Both ends of the toothed portion 24a of the pinion 24 of the sliding mechanism M constructing part of the air mix door 5 are formed as teeth 24b each having a comparatively higher tooth depth. As a consequence, there is slight backward shifting motion of the air mix door 5, just before the air mix door 5 reaches its uppermost position (during the maximum heating mode) or to its lowermost position (during the maximum cooling mode). This ensures an air-tight seal between the seal member fitted to the perimeter of the rear face of the air mix door 5 and the inner peripheral edge of upper or lower openings (not numbered) of the backwardly-curved intermediate partition disposed between the evaporator core 3 and the heater core 4. In the embodiment shown in FIG. 1, although the single air mix door 5 is provided downstream of the evaporator 3 and upstream of the heater core 4, two-split air mix doors (or two separated temperature-bend doors) may be provided independently at the right and left sides to enable independent temperature adjustments or regulations on the driver's seat side and the assistant's seat side. Alternatively, as will be fully described later by reference to the modified HVAC unit shown in FIG. 6, two separated air mix doors may be provided independently at the upper and lower sides to enable independent temperature adjustments or regulations on front and rear passenger compartments.

With the previously-discussed structure of the heating, ventilation, and air conditioning (HVAC) unit of the embodiment, there is no need for provision of a foot vent duct and a rear vent duct both of which may be projected or expanded outwardly from the outer peripheral wall of the conventional HVAC unit, since the foot-vent/rear-vent communication passage 12 is defined at the downstream end of the air mix chamber 6 by the partition wall 11 in a manner so as to extend substantially vertically along the inner wall surface of the HVAC case 1, and additionally the rear vent outlet 14 is formed in close vicinity to the foot vent outlet 13. Thus, the HVAC unit of the embodiment is compact in size. Also, the improved HVAC unit has enhanced installation flexibility. Furthermore, in the shown embodiment, the air delivery mode for both the foot vent outlet 13 and the rear vent outlet 14 is switchable by means of the single mode door 15 capable of operating at three air-delivery modes, namely the vent mode, the defrost mode, and the foot mode. The use of the single mode door effectively reduces the number of component parts of the HVAC unit, thus reducing total production costs of the HVAC system. Also, in the embodiment shown in FIG. 1, the foot-vent/rear-vent communication passage 12 is designed to be divided into a plurality of partitioned passageway sections 12A, 12B and 12C in the transverse direction by means of partition walls 11a. Additionally, the rear vent outlet 14 is formed at the rear end of the HVAC case 1 corresponding to the central partitioned air passageway 12B in a manner so as to communicate with the latter. Therefore, the center foot vent outlet 13B, communicating the central partitioned air passageway 12B, can serve as a rear foot vent outlet, whereas the left and right foot vent outlets 13A and 13C, respectively formed at the downstream ends of the left and right partitioned air passageways 12A and 12C, can serve as the driver's seat side foot vent outlet and the assistant's seat side foot vent outlet. The pivot shaft 16 of the mode door 15 is provided to cross the respective partitioned air passageways 12A, 12B and 12C in the transverse direction, and thus there is a short span (a short distance) between two adjacent bearings of the radial bearings respectively fitted to the partition walls (11a, 11a) and both side walls of the HVAC case 1, and thus the pivot shaft 16 can be reliably supported without any deflection. This insures a smooth opening and closing action of the mode door 15. Moreover, the vent door 8, serving to open and close the vent outlet 7 formed at the upper wall of the HVAC case 1 above the air mix chamber 6, is constructed as a sliding door (S.D) slidable along the inner peripheral wall surface of the upper wall of the HVAC case 1 by means of the sliding mechanism M, and thus there is no possibility that the vent door 8 opens within toward the air mix chamber 6 and disturb all the flow of cool air coming from the evaporator core 3 via the air mix door 5 and the flow of warm air coming from the heater core 4 via the air mix door 5, and the flow of conditioned air from the air mix chamber 6 towaed the vent outlet 7 opened. This enhances an air mixing performance or temperature-blend. performance in the blend of the cold and warm air flows within the air mix chamber 6, and also enables a smooth conditioned-air flow through the vent door 8 (the sliding door). Additionally, the vent door 8, constructed as the sliding door (S.D), contributes to reduction in fluid-flow resistance to the conditioned-air flow, thus insuring the desired amount of conditioned air or temperature-regulated air flowing through the vent outlet 7. As previously discussed, the retracted position of the vent door 8 (the sliding door S.D) is properly set, so that the vent door never disturbs the flow of blended air from the air mixing chamber 6 within toward the upstream end of the foot-vent/rear-vent communication passage 12. Thus, even with the vent door 8 held at its retracted position, the vent door 8 scarcely acts as a fluid-flow resistance to the incoming blended air flow into the foot-vent/rear-vent communication passage 12. This avoids undesired reduction in the amount of discharged air from the rear vent outlet 14, or reduction in the amount of discharged air from the foot vent outlet 13 during the bi-level mode at which the mode door flaps 17 are kept at their midpoints, thus ensuring a proper air delivery and proper discharging action of conditioned air through the foot vent outlet 13 and the rear vent outlet 14.

Figure 6:
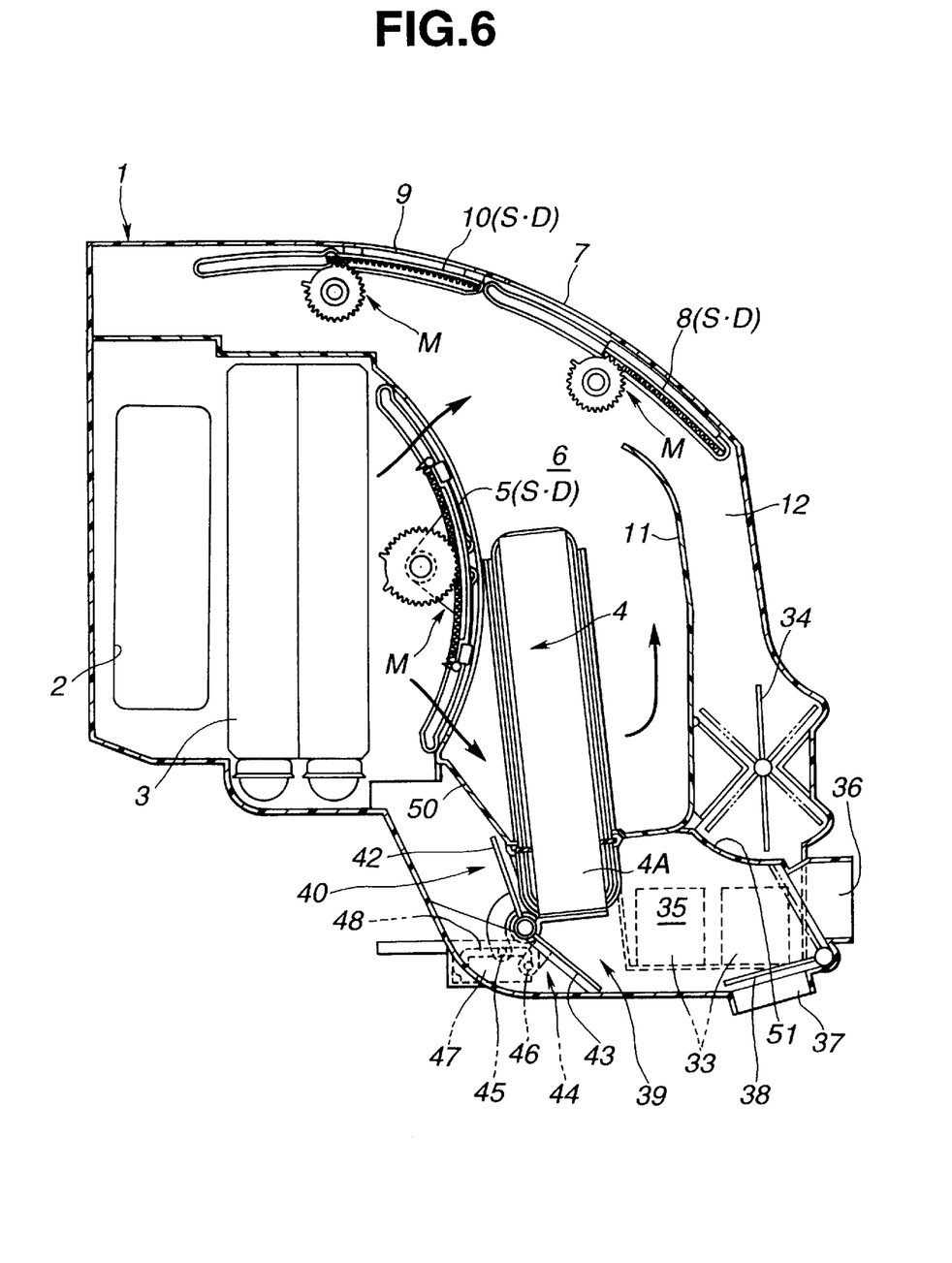
FIG. 6 is a longitudinal cross-sectional view illustrating a modified automobile heating, ventilation, and air conditioning (HVAC) unit of the invention.
Figure 7A:
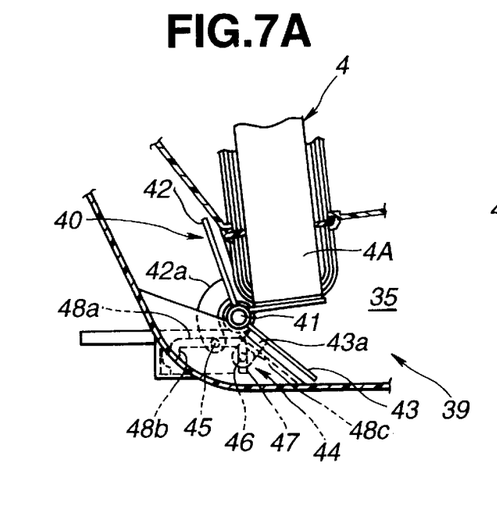
FIGS. 7A through 7D are partial cross-sectional views explaining the operation of a mode-select door assembly (40) employed in the modified HVAC unit of the invention.
Figure 7B:
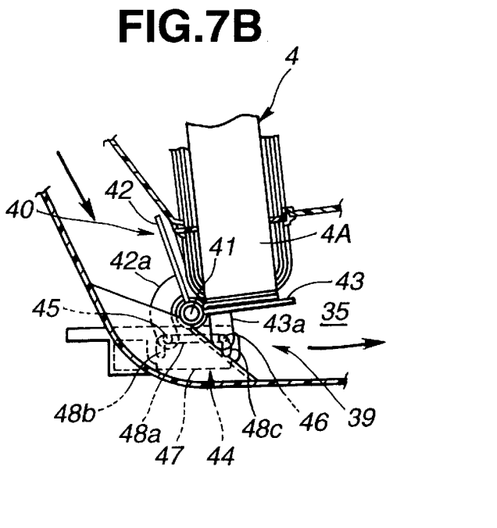
Figure 7C:
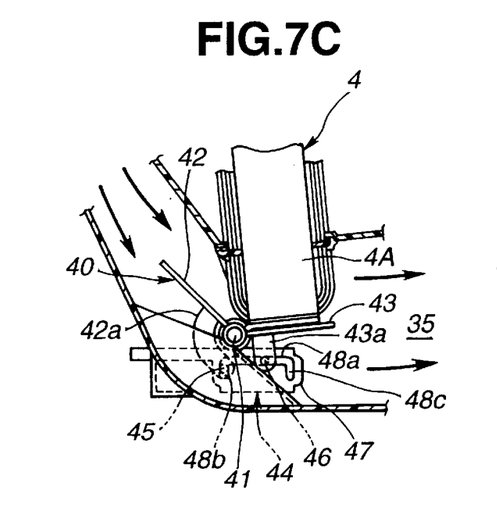

Referring now to FIGS. 6, and 7A to 7D, there is shown a modified heating, ventilation, and air conditioning (HVAC) unit of the invention. The modified HVAC unit shown in FIGS. 6 to 7C is similar to the HVAC unit of the embodiment shown in FIGS. 1 to 5, except that the modified HVAC unit can make independent temperature adjustments or regulations on front and rear passenger compartments by means of a mode-select door assembly (or a second temperature-blend door assembly) 40, and that the communication passage 12 shown in FIG. 1 is constructed as a foot-vent/rear-vent communication passage, whereas the communication passage 12 shown in FIG. 6 is constructed only as a foot-vent communication passage communicating foot vent outlets (33, 33), and that a rear vent passage 35 for a rear foot outlet 36 is separated from the foot-vent communication passage 12. Thus, the same reference signs used to designate elements in the HVAC unit shown in FIG. 1 will be applied to the corresponding elements used in the modified HVAC unit shown in FIG. 6, for the purpose of comparison of the two HVAC units shown in FIGS. 1 and 6. The structure and operation of the mode-select door assembly 40 will be hereinafter described in detail with reference to the accompanying drawings, while detailed description of the respective doors 5, 8 and 10, will be omitted because the above description thereon seems to be self-explanatory.

As seen in FIG. 6, the communication passage 12 is defined in a manner so as to extend substantially vertically along the inner wall surface of the HVAC case 1 and to communicate at its upstream end with the downstream end of the air mix chamber 6. The HVAC case 1 is formed at its rear lower end with foot vent outlets 33 communicating with the communication passage 12. The respective foot vent outlets 33 are opened and closed by means of a foot vent door 34. The foot vent outlets 33 are used to deliver conditioned air toward the front passenger compartment. In the modified HVAC unit, note that the rear vent passage 35 is further defined by means of partition walls 50 and 51 at the bottom of the HVAC case 1 independently of the foot vent communication passage 12, in such a manner that the rear vent passage 35 communicates with the air-delivery passage between the evaporator core 3 and the heater core 4 and extends back and forth at the bottom of the HVAC case 1. The rear bottom end of the HVAC case 1 has a rear vent outlet 36 communicating with the downstream end of the rear vent passage 35. In the modified HVAC unit, a rear foot vent outlet 37 is formed in close vicinity to the rear vent outlet 36 at the bottom rear end of the HVAC case 1, in a manner as to communicate with the rear vent passage 35. In a some what similar manner as the mode door 15 shown in FIG. 1, a single mode door 38 is provided at the branched portion between the rear vent outlet 36 and the rear foot vent outlet 37, for adjusting the conditioned-air amount to be delivered to the rear vent outlet 36 and the conditioned-air amount to be delivered to the rear foot vent outlet 37. As seen in FIG. 6, the lower part (approximately one-fourth the vertical entire length of the heater core 4) of the heater core enters partly into the upper half of the rear vent passage 35 in such a manner as to penetrate the two partition walls 50 and 51. The above-mentioned lower end of the heater core 4 effectively functions as a heat exchanger 4A for the rear vent passage side (precisely for the rear passenger compartment temperature adjustment). In addition to the sliding-door type air mix door 5, the modified HVAC unit has a mode-select door assembly (or a control door assembly) 40 in close vicinity to the front bottom edge of the heat exchanger 4A. The mode-select door assembly 40 serves as a second air-mix door assembly completely separated from the first air mix door 5. The mode-select door assembly 40 operates at four operating modes, namely a shut-off mode in which the cool air coming from the evaporator core 3 is prevented from being delivered into the rear vent passage 35 (see FIG. 7A), a maximum cooling mode (or a full cool mode) in which the evaporator-core air (cool air) coming from the evaporator toward the rear vent passage is permitted to flow through only the bypass passage 39 (see FIG. 7B), a maximum heating mode (or a full hot mode) in which the evaporator-core air (cool air) coming from the evaporator toward the rear vent passage is permitted to flow through only the heat exchanger 4A (see FIG. 7D), and a temperature blend mode (or an air mix mode) in which the evaporator-core air (cool air) coming from the evaporator toward the rear vent passage is permitted to flow through both the bypass passage 39 and the heat exchanger 4A (see FIG. 7C). As appreciated from FIGS. 6 and 7B, for example, in the full cool mode (see FIG. 7B), the mode-select door assembly 40 operates to shut off the interior air flow through the heat exchanger 4A and to permit the evaporator-core air (cool air) to flow through a bypass passage 39 defined below the heat exchanger 4A. The bypass passage 39 communicates the rear vent passage 35. As best seen in FIG. 6, it is preferable that the mode-select door assembly 40 comprises a pivot shaft 41 mounted in close vicinity to the front bottom edge of the heat exchanger 4A, a first door flap 42 located upstream of the heat exchanger 4A and supported rotatably on the pivot shaft 41, a second door flap 43 disposed within the bypass passage 39 and supported rotatably on the pivot shaft 41, and a mode control mechanism 44 capable of operating the first and second mode-select door flaps 42 and 43 independently of each other. As seen in FIGS. 7A to 7D, it is preferable that the mode-control mechanism 44 comprises a guide pin 45 attached to a tip end of a slightly curved arm portion 42a projected from the lower surface of the root portion of the first door flap 42, a guide pin 46 attached to a tip end of an essentially straight arm portion 43a projected from the lower surface of the root portion of the second door flap 43, and a cam plate 47 having a cam groove 48 engaging slideably with both the guide pins 45 and 46. The mode-control mechanism 44 is provided eccentrically at one side wall of the HVAC case 1 within the rear vent passage 35. The cam plate 47 is mounted on the HVAC case 1, so that the front end of the cam plate 47 penetrates the front bottom end of the HVAC case 1 in front of the rear vent passage 35 and then projects outwards from the outer wall of the HVAC case. Although it is not clearly shown, actually, the projected end of the cam plate 47 is actuated back and forth by way of a push-pull cable (not shown) or the like. As seen in FIGS. 7A to 7D, the cam groove 48 of the cam plate 47 is comprised of a substantially fore-and-aft extending horizontal cam groove section 48a, and a pair of substantially up-and-down extending vertical cam groove sections 48b and 48c respectively extending downwards from both ends of the horizontal cam groove section 48a. Details of the mode-control operation (or the mode-select operation) of the mode-control door assembly 40 are here below described in detail by reference to FIGS. 7A to 7D.

Figure 7D:
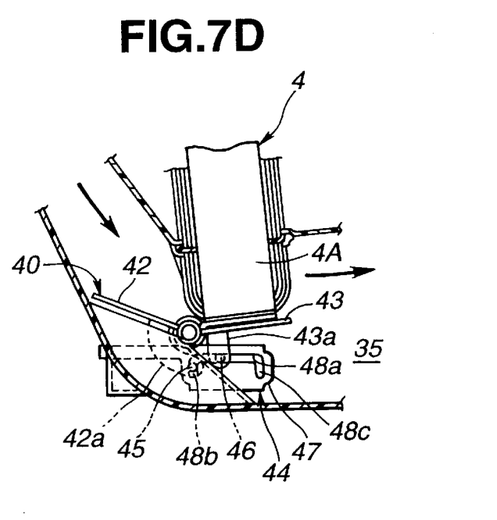

As seen in FIG. 7A, in the shut-off mode position, the guide pin 45 is maintained within the horizontal cam groove portion 48a, while the guide pin 46 is kept at the lower stop limit of the rear vertical cam groove portion 48c, with the result that the first door flap 42 is kept at its fully closed position to shut off the heat-exchanger air flow and that the second door flap 43 is kept at its fully closed position to shut off the cool air flow passing through the bypass passage 39. As seen in FIG. 7B, in the full cool mode position, the guide pin 45 is maintained at the connection portion between the horizontal cam groove section 48a and the front vertical cam groove section 48b, while the guide pin 46 is kept at the connection portion between the horizontal cam groove section 48a and the rear vertical cam groove section 48c, with the result that the first door flap 42 is kept at the fully closed position to prevent the heat-exchanger air flow and that the second door flap 43 is kept at the full open position to permit almost all of the incoming evaporator-core air (the incoming cool air) directed toward the rear vent passage 35 to be routed through the bypass passageway 39. As seen in FIG. 7C, in the air mix mode position (or the temperature blend mode position), the guide pin 45 is maintained in the middle of the front vertical cam groove section 48b, while the guide pin 46 is kept within the horizontal cam groove section 48a, with the result that the first door flap 42 is kept at an essentially half-open position (or the partly opened position) and the second door flap 43 is kept at the full open position to adjust the percentage of evaporator-core air (cool air) and heat-exchange air (warm air) toward a desired percentage. As seen in FIG. 7D, in the full hot mode position, the guide pin 45 is maintained substantially at the lower stop limit of the front vertical cam groove section 48b, while the guide pin 46 is kept within the horizontal cam groove section 48a, with the result that the first and second door flaps 42 and 43 are kept at their full open angular positions to permit almost all of the incoming evaporator-core air (the incoming cool air) directed toward the rear vent passage 35 to be routed through only the heat exchanger 4A. In the full hot mode, with the first door flap 42 kept at its full open position, the first door flap 42 also serves to prevent the incoming air from being routed through the bypass passage 39.

In the modified HVAC unit discussed above, part of cool air flowing through the evaporator core 3 is introduced into the rear vent passage 35, and then the blend of evaporator-core air (cool air) and heat-exchanger air (warm air) being fed into the rear passenger compartment is able to be controlled or adjusted by means of the mode-select door 40 installed within the rear vent passage 35. Thus, the conditioned air discharged through the rear vent outlet 36 into the rear passenger compartment can be temperature-controlled independently of the conditioned air discharged through the vent outlet 7 into the front passenger compartment. As a consequence, it is possible to make independent temperature adjustment suitable to a rear passenger's preference, independently of temperature adjustment on the front passenger compartment. Furthermore, the modified HVAC unit never requires additional ducts on the outer peripheral wall of the HVAC case, since the rear vent passage 35 is formed integral with the HVAC case 1 at the bottom thereof by virtue of the partition walls 50 and 51. Thus, as can be appreciated from the contour of the HVAC unit shown in FIG. 6, the modified HVAC unit is smart in shape and compact in size, thus enhancing installation flexibility. In the same manner as the HVAC unit of the embodiment shown in FIG. 1, the modified HVAC unit of FIG. 6 has the rear foot vent outlet 37 being located in close vicinity to the rear vent outlet 36 of the rear vent passage 35, and the flow rate of conditioned air through the rear vent outlet 36 and the flow rate of conditioned air through the rear foot vent outlet 37 are regulated or adjusted by means of the single mode door 38 hinged midway between the two outlets 36 and 37. The discharge mode of temperature-adjusted air suitable to the rear passenger's needs can be selected, depending on the angular position of the single mode door 38. Moreover, in the modified HVAC unit, the two mode-select door flaps 42 and 43 can be operated independently of each other by means of the mode control mechanism 44, depending upon a mode selected from the four operating modes, namely the shut-off mode, the full cool mode, the air mix mode, and the full hot mode, and thus it is possible to properly control or regulate the percentage of evaporator-core air (cool air) and heat-exchanger air (warm air) being fed into the rear vent passage 35, and thus to properly make temperature adjustment of conditioned air to be discharged from the rear vent outlet 36 and/or the rear foot vent outlet 37, independently of temperature adjustment of conditioned air to be discharged into the front passenger compartment. Furthermore, the above-mentioned mode-control mechanism 44 comprises the two guide pins 45 and 46 fixedly connected to the respective door flaps 42 and 43, and the cam plate 47 being in cam-connection with the two guide pins through the substantially C-shaped cam groove 48, in order to produce the respective individual pivotal motions of the two door flaps 42 and 43, depending on the forward and backward movements of the cam plate 47. As a whole, the structure of the mechanical linkage necessary for the pivotal motions of the door flaps 42 and 43 is very simple, This reduces the number of mechanical parts of the HVAC unit, and consequently decreasing total production costs of the HVAC unit.

As set out above, in both the HVAC units shown in FIGS. 1 and 6, the rear end of the air mix chamber 6 is partitioned by way of the partition wall 11 to define the foot-vent/rear-vent communication passage or the foot-vent communication passage 12, and thus it is unnecessary to install an additional duct on the outer peripheral wall of the HVAC case 1. Thus the HVAC unit of the present invention is smart in shape and compact in size and has enhanced installation flexibility.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automobile heating, ventilation, and air conditioning unit, comprising:

a heating, ventilation, and air conditioning case permitting flow of interior air;

an evaporator core disposed in said case for cooling air;

a heater core disposed in said case downstream of said evaporator core for heating the cool air to produce warm air;

an air mix chamber defined in said case for blending the cool air with the warm air;

an air mix door disposed between said evaporator core and said heater core for controlling a percentage of the cool air and the warm air being fed into said air mix chamber, depending on a position of said air mix door;

a foot-vent communication passage defined in said case by partitioning a rear end of said air mix chamber by a partition wall extending substantially vertically along an inner wall of said case so that said foot-vent communication passage communicates with a downstream end of said air mix chamber;

wherein said case has foot vent outlets at a lower end of said foot-vent communication passage and has a rear vent outlet in close vicinity to said foot vent outlets; and a mode door for adjusting a percentage of conditioned air through said foot vent outlet and conditioned air through said rear vent outlet.

2. The automobile heating, ventilation, and air conditioning unit, as claimed in claim 1, wherein said foot-vent passage is divided into a plurality of partitioned air passageway sections by partition walls, and said rear vent outlet is formed in a part of said case corresponding to either one of said partitioned air passageway sections, and wherein said mode door has a pivot shaft extending in said partitioned air passageway sections in a transverse direction, and further including a plurality of door flaps fixedly connected to respective individual shaft sections of said pivot shaft, each corresponding to either one of said partitioned air passageway sections.

3. The automobile heating, ventilation, and air conditioning unit, as claimed in claim 2, wherein said case has a vent outlet in an upper wall of said case above said air mix chamber, and further including a vent door provided along the inner peripheral wall surface of the upper wall of said case for opening and closing said vent outlet, and said vent door comprises a sliding mechanism and a sliding door being slidable along the inner peripheral wall surface of the upper wall of said case by said sliding mechanism and operated between a shut-off position in which said vent outlet is shut off and a retracted position in which said vent door is fully opened to permit conditioned-air flow through said vent outlet without disturbing conditioned-air flow from said air mix chamber within toward said foot-vent communication passage.

4. An automobile heating, ventilation, and air conditioning unit, comprising:

a heating, ventilation, and air conditioning case permitting flow of interior air;

an evaporator core disposed in said case for air cooling air;

a heater core disposed in said case downstream of said evaporator core for heating the cool air to produce warm air;

an air mix chamber defined in said case for blending the cool air with the warm air;

an air mix door disposed between said evaporator core and said heater core for controlling a percentage of the cool air and the warm air being fed into said air mix chamber, depending on a position of said air mix door;

a foot-vent communication passage defined in said case by partitioning a rear end of said air mix chamber by a partition wall extending substantially vertically along an inner wall of said case so that said foot-vent communication passage communicates with a downstream end of said air mix chambers, wherein said case has foot vent outlets at a lower end of said foot-vent communication passage and has a rear vent outlet in close vicinity to said foot vent outlets; and a rear vent passage defmed within said case so that said rear vent passage communicates with an air-delivery passage between said evaporator core and said heater core and extends back and forth at the bottom of said case;

wherein said case has a rear vent outlet at a rear end of said rear vent passage, and a lower end of said heater core enters partly into said rear vent passage to form a heat exchanger for a rear passenger compartment independently of a heat exchanger for a front passenger compartment, and said case has a bypass passage defined below said heat exchanger, and a mode-select door located in close vicinity to said heat exchanger for controlling a percentage of the cool air flowing through said bypass passage into said rear vent passage and the warm air flowing through said heat exchanger into said rear vent passage.

5. The automobile heating, ventilation, and air conditioning unit, as claimed in claim 6, wherein said mode-select door comprises a pivot shaft mounted in close vicinity to a front bottom edge of said heat exchanger, a first door flap located upstream of said heat exchanger and supported rotatably on said pivot shaft, a second door flap disposed within said bypass passage and supported rotatably on said pivot shaft, and a mode-control mechanism mechanically linked to said first and second door flaps for providing four operating modes, a shut-off mode in which the cool air coming from said evaporator is prevented from being delivered into said rear vent passage, a full cool mode in which the cool air coming from said evaporator core toward said rear vent outlet is permitted to be routed through only said bypass passage, an air mix mode in which the cool air coming from said evaporator core toward said rear vent outlet is permitted to be routed through both said bypass passage and said heat exchanger, and a full hot mode in which the cool air coming from said evaporator core toward said rear vent outlet is permitted to be routed through only said heat exchanger.

6. The automobile heating, ventilation, and air conditioning unit, as claimed in claim 5, wherein said mode-control mechanism comprises first and second guide pins respectively attached to said first and second door flaps, and a cam plate having a cam groove through which said cam plate is in cam-connection with said guide pins to produce respective individual pivotal motions of said door flaps, depending on forward and backward movements of said cam plate.

7. The automobile heating, ventilation, and air conditioning unit, as claimed in claim 6, wherein said case has a rear foot vent outlet in close vicinity to said rear vent outlet at the rear end of said rear vent passage, and further including a mode door disposed within said rear vent passage for adjusting an amount of conditioned air to be delivered to said rear vent outlet and an amount of conditioned air to be delivered to said rear foot vent outlet.

* * * * *